United States Patent
Nishizuka

(10) Patent No.: US 12,246,592 B2
(45) Date of Patent: Mar. 11, 2025

(54) LID DEVICE

(71) Applicant: ALPHA CORPORATION, Kanagawa (JP)

(72) Inventor: Mitsuo Nishizuka, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 0 days.

(21) Appl. No.: 18/349,620

(22) Filed: Jul. 10, 2023

(65) Prior Publication Data

US 2023/0347733 A1 Nov. 2, 2023

Related U.S. Application Data

(63) Continuation of application No. PCT/JP2022/000402, filed on Jan. 7, 2022.

(30) Foreign Application Priority Data

Jan. 12, 2021 (JP) .................. 2021-002918

(51) Int. Cl.
*B60K 15/05* (2006.01)

(52) U.S. Cl.
CPC ...... *B60K 15/05* (2013.01); *B60K 2015/0553* (2013.01)

(58) Field of Classification Search
CPC ............... B60K 15/05; B60K 2015/0553
USPC ...................................... 296/97.22
See application file for complete search history.

(56) References Cited

U.S. PATENT DOCUMENTS

| | | | |
|---|---|---|---|
| 2009/0189410 A1 | 7/2009 | Gurtatowski et al. | |
| 2012/0313382 A1 | 12/2012 | Lee et al. | |
| 2015/0151696 A1 | 6/2015 | Iwata | |
| 2019/0241066 A1 | 8/2019 | Kim et al. | |
| 2020/0130505 A1 | 4/2020 | Yagura | |

FOREIGN PATENT DOCUMENTS

| | | | | |
|---|---|---|---|---|
| CN | 204567272 U | | 8/2015 | |
| CN | 113200009 A | * | 8/2021 | ............. B60L 53/16 |
| EP | 3738812 A1 | * | 11/2020 | |
| FR | 2871431 A1 | * | 12/2005 | ............. B60K 15/05 |
| JP | H03-10925 U | | 2/1991 | |
| JP | 2013-001384 A | | 1/2013 | |

(Continued)

OTHER PUBLICATIONS

EP-3738812-A1 (Campestrini et al.) (Nov. 18, 2020) (Machine Translation) (Year: 2020).*

(Continued)

*Primary Examiner* — Mahmoud Gimie
(74) *Attorney, Agent, or Firm* — Studebaker Brackett PLLC

(57) ABSTRACT

A lid device to be mounted on an oil filler port or an power supply port of a vehicle and for opening and closing the oil filler port or the power supply port includes a housing configured to be assembled to the oil filler port or the power supply port, a support body provided to be rotatable with respect to the housing, and a lid body attached to the support body. Reinforcing rib protruding toward a lid body side is formed on the support body. A portion of the reinforcing rib along a horizontal direction is inclined such that free end side faces downward when the lid device is mounted on the oil filler port.

5 Claims, 11 Drawing Sheets

(56) References Cited

FOREIGN PATENT DOCUMENTS

| | | |
|---|---|---|
| JP | 2013-123930 A | 6/2013 |
| JP | 2013-144507 A | 7/2013 |
| JP | 2015-104983 A | 6/2015 |
| JP | 2016-088252 A | 5/2016 |
| JP | 2017-154720 A | 9/2017 |
| JP | 2018-167833 A | 11/2018 |
| JP | 2019-018673 A | 2/2019 |

OTHER PUBLICATIONS

FR-2871431-A1 (Renou et al) (Dec. 16, 2005) (Machine Translation) (Year: 2005).*
An Office Action; "Notice of Reasons for Refusal," mailed by the Japanese Patent Office on Apr. 2, 2024, which corresponds to Japanese Patent Application No. 2021-002918 and is related to U.S. Appl. No. 18/349,620; with English language translation.
International Search Report issued in PCT/JP2022/000402; mailed Mar. 22, 2022.
Written Opinion of the International Searching Authority issued in PCT/JP2022/000402; mailed Mar. 22, 2022.
Extended European Search Report issued in EP 22 73 9358.4-1009 by the European Patent Office on Jan. 3, 2025, which is related to U.S. Appl. No. 18/349,620.

* cited by examiner

LID DEVICE

CROSS-REFERENCE TO RELATED APPLICATIONS

The present application is a continuation application of PCT/JP2022/000402 that claims priority to Japanese Patent Application No. 2021-002918 filed on Jan. 12, 2021, the entire content of which is incorporated herein by reference.

TECHNICAL FIELD

The present disclosure relates to a lid device.

BACKGROUND ART

As a lid device for opening and closing an oil filler port or a power supply port of a vehicle such as an automobile, there is a lid device that includes a housing mounted on the oil filler port, a lid that includes a support body and a lid body and opens and closes an opening of the housing, and a link member that connects the lid to the housing in an openable and closable manner (for example, see Patent Literature 1).
Patent Literature 1: JP2018-167833A Water may enter the lid formed by assembling the lid body to the support body through a gap between the support body and the lid body during vehicle washing or the like. Therefore, in the lid, the water entering from the gap between the support body and the lid body may accumulate in a rib provided in the support body in order to ensure strength. When the lid is opened in this state, the water in the lid may be scattered by a force of opening the lid and splashed on a user.

The present disclosure relates a lid device capable of suppressing scattering of water during opening and closing while ensuring sufficient strength.

SUMMARY OF INVENTION

A lid device according to the present disclosure is as follows. A lid device is mounted on an oil filler port or an power supply port of a vehicle and is configured to open and close the oil filler port or the power supply port. The lid device includes a housing configured to be assembled to the oil filler port or the power supply port, a support body provided to be rotatable with respect to the housing, and a lid body attached to the support body. A reinforcing rib protruding toward a lid body side is formed on the support body. In a state in which the lid device is mounted on the oil filler port or the power supply port, a portion of the reinforcing rib along a horizontal direction is inclined such that a free end side faces downward.

According to the present disclosure, it is possible to provide the lid device capable of suppressing scattering of water during opening and closing while ensuring sufficient strength.

DESCRIPTION OF EMBODIMENTS

A specific embodiment of the present disclosure will be described below with reference to the drawings.

Figure 1:
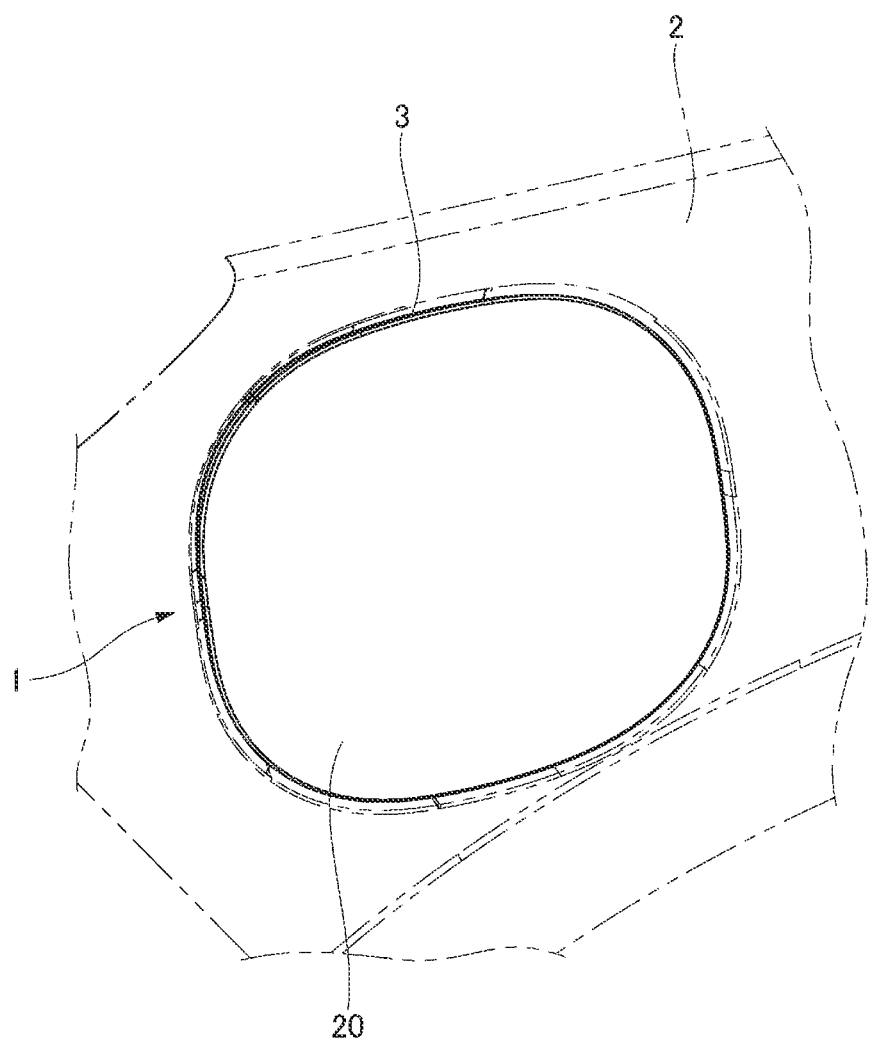
FIG. 1 is a perspective view of a rear fender of a vehicle on which a lid device is mounted.

FIG. 1 is a perspective view of a rear fender of a vehicle on which a lid device is mounted. As shown in FIG. 1, a lid device 1 according to the present embodiment is mounted on an oil filler port 3 provided in a rear fender 2 of the vehicle such as an automobile. The lid device 1 includes a lid 20 that opens and closes the oil filler port 3. A user performs an oil filling operation on the vehicle in a state in which the oil filler port 3 is open, and closes the oil filler port 3 with the lid 20 of the lid device 1 after the oil filling operation is completed. The lid device 1 has a lock mechanism that locks the lid 20 in a state in which the oil filler port 3 is closed, and for example, the lid device 1 can be opened and closed by releasing the lock of the lid 20 in conjunction with an operation of an opener in a vehicle interior or an operation of unlocking a door lock of the vehicle. In the lid device 1, by pushing a surface of the lid 20 in a unlocked state, the lid 20 is pushed up by a certain amount by a push lifter 15 to be described later.

Figure 2:
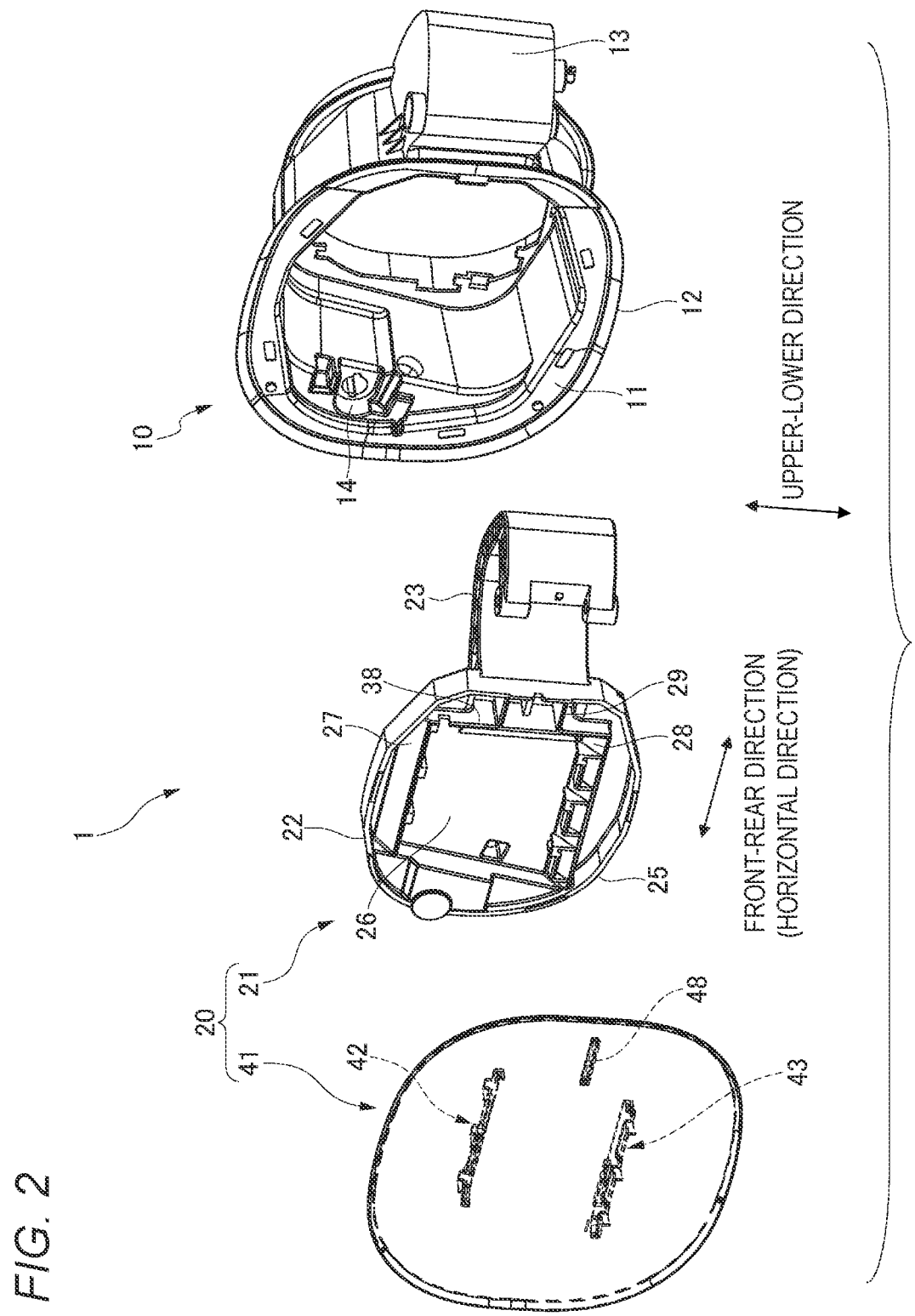
FIG. 2 is an exploded perspective view of the lid device according to the present embodiment.
Figure 3A:
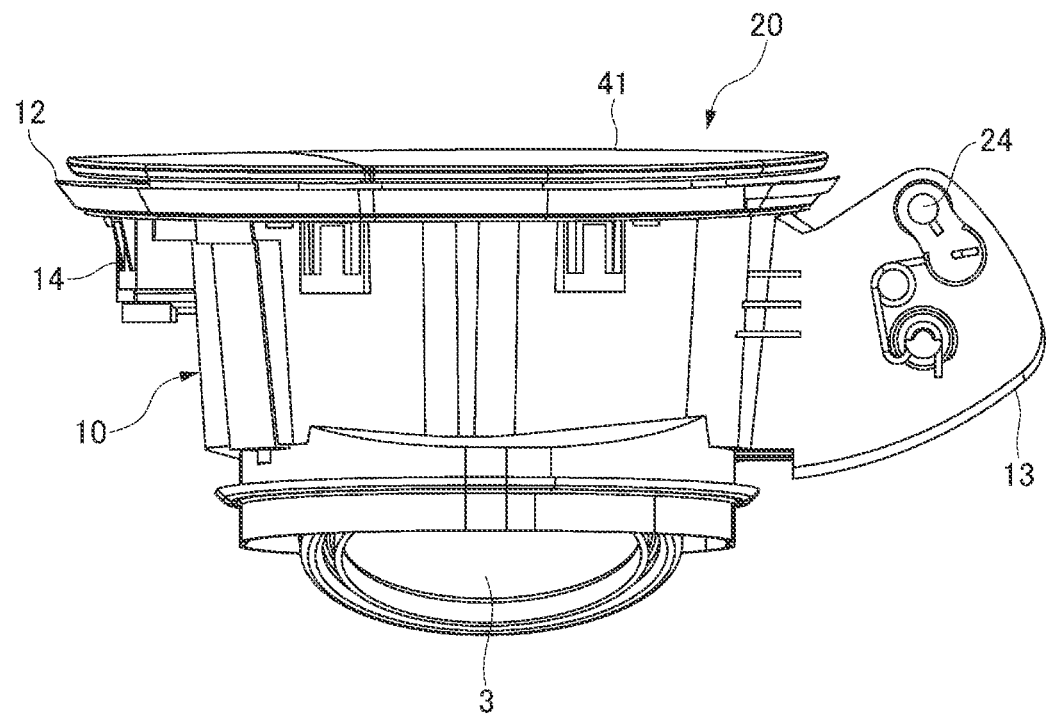
FIG. 3A shows view of the lid device according to the present embodiment and is a plan view viewed from below.
Figure 3B:
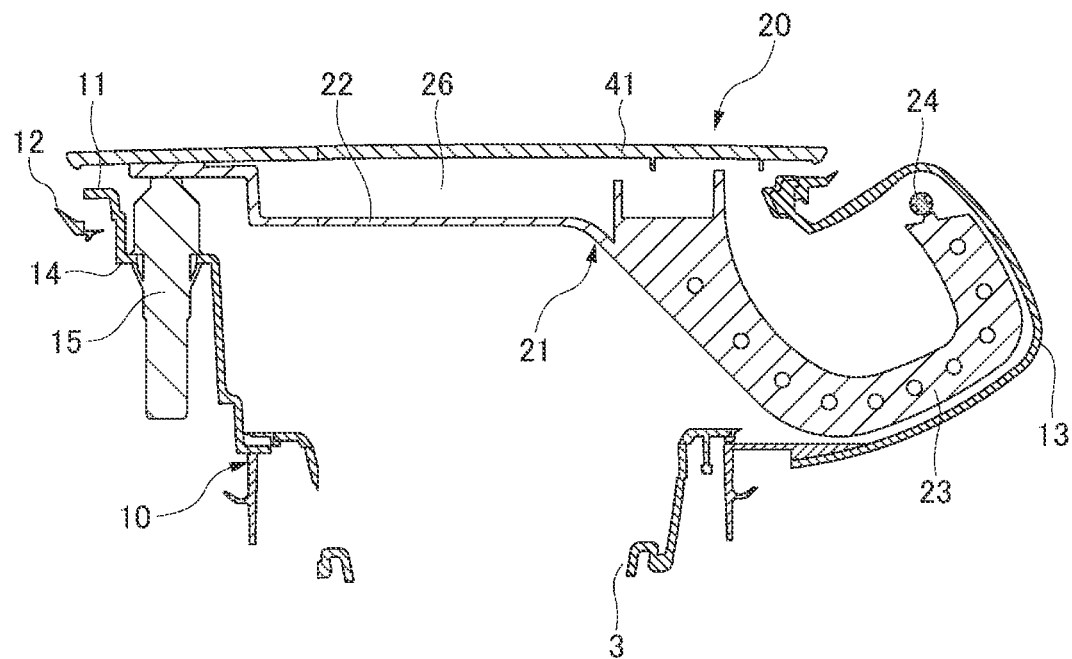
FIG. 3B shows view of the lid device according to the present embodiment and is a schematic cross-sectional view taken along a horizontal direction.

FIG. 2 is an exploded perspective view of the lid device according to the present embodiment. FIG. 3A and FIG. 3B show views of the lid device according to the present embodiment, in which FIG. 3A is a plan view viewed from below, and FIG. 3B is a schematic cross-sectional view taken along a horizontal direction.

As shown in FIG. 2, FIG. 3A, and FIG. 3B, the lid device 1 includes a housing 10 and the lid 20.

The housing 10 is formed in a tubular shape. A recessed mounting portion (not shown) is formed on the rear fender 2 of the vehicle. The housing 10 is fitted and assembled to the mounting portion. A flange portion 12 having a design panel portion 11 is provided on an opposite side of the housing 10 from an assembly side of the housing 10 to the oil filler port 3. The housing 10 has an arm accommodating chamber 13 protruding outward on one side portion. A push lifter mounting portion 14 is formed on the other side portion of the housing 10, and the push lifter 15 is attached to the push lifter mounting portion 14 (see FIG. 3B).

The lid 20 includes a support body 21 and a lid body 41. The support body 21 includes a body portion 22 and an arm portion 23. The body portion 22 is formed in a substantially plate shape, and the lid body 41 is attached to a front surface side on an opposite side of the body portion 22 from an assembly side of the body portion 22 to the housing 10. The arm portion 23 is integrally connected to one side portion of the body portion 22. The arm portion 23 extends obliquely rearward from the body portion 22, and a front portion thereof is curved forward.

The support body 21 is assembled to the housing 10 by inserting the arm portion 23 into the arm accommodating chamber 13 from a front side of the housing 10. In the support body 21, the front portion of the arm portion 23 accommodated in the arm accommodating chamber 13 is rotatably supported by a rotating shaft 24 (see FIG. 3B). Accordingly, the lid 20 can be opened and closed with respect to an opening portion formed in the flange portion 12 of the housing 10.

Figure 4A:
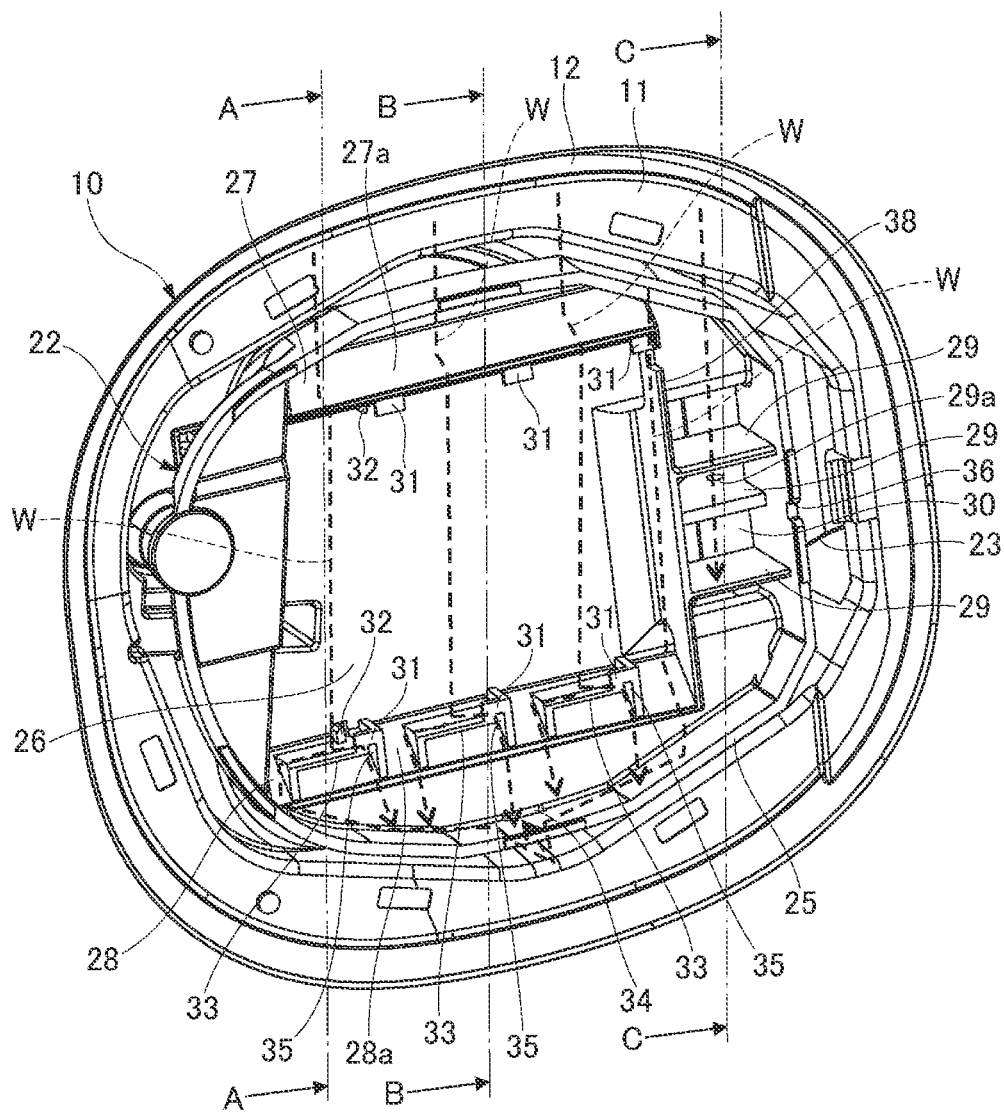
FIG. 4A shows view of a state in which a lid body of the lid device mounted on an oil filler port is removed and is an overall perspective view.
Figure 4B:
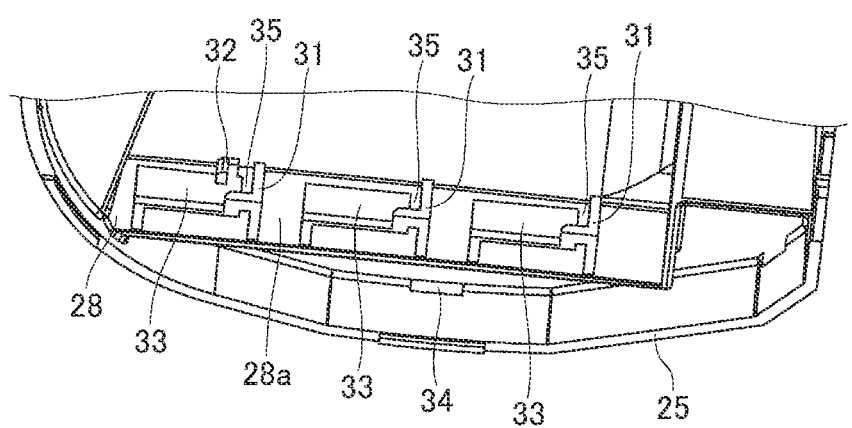
FIG. 4B shows view of a state in which the lid body of the lid device mounted on an oil filler port is removed and is a perspective view of a lower portion.

FIG. 4A and FIG. 4B show views of a state in which the lid body of the lid device mounted on the oil filler port is removed, in which FIG. 4A is an overall perspective view, and FIG. 4B is a perspective view of a lower portion.

As shown in FIG. 4A, the body portion 22 of the support body 21 has a peripheral wall portion 25 protruding toward an attachment side of the lid body 41 at a peripheral edge thereof. The body portion 22 has a flat plate portion 26 at a center portion thereof. In the body portion 22, for example, a label (not shown) on which the type of oil supplied from the oil filler port 3 is described can be attached to a back surface side of the flat plate portion 26.

The body portion 22 of the support body 21 has two reinforcing ribs 27, 28 on the attachment side of the lid body 41. The reinforcing ribs 27, 28 are formed along the horizontal direction (a front-rear direction of the vehicle). In order to reduce the weight of the reinforcing ribs 27, 28, a back surface side of the body portion 22 is thinned to make the body portion 22 have a V-shaped cross section. The reinforcing rib 27 is formed on an upper portion of the flat plate portion 26, and the reinforcing rib 28 is formed on a lower portion of the flat plate portion 26. Upper surfaces of the reinforcing ribs 27, 28 are inclined surfaces 27a, 28a that are inclined such that free end sides face downward. Strength of the lid 20 is further enhanced by providing the reinforcing ribs 27, 28 in the body portion 22. Accordingly, when the lid 20 is opened, even if any part of the surface of the lid 20 is pushed, the pushing force is transmitted to the push lifter 15 so as to push up the lid 20.

The reinforcing ribs 27, 28 each have three L-shaped locking claws 31 on the facing sides. That is, the respective locking claws 31 are formed on a lower surface of the reinforcing rib 27 and the upper surface which is the inclined surface of the reinforcing rib 28, and are disposed at intervals in the horizontal direction.

As shown in FIG. 4B, three support plate portions 33 are formed in the reinforcing rib 28. The support plate portions 33 are integrally formed with the inclined surface 28a of the reinforcing rib 28, and the locking claw 31 is formed at one end of each support plate portion 33. An upper surface of each support plate portion 33 is substantially parallel to the lower surface of the reinforcing rib 27 formed on the upper portion of the flat plate portion 26. Accordingly, a posture of the locking claw 31 provided on the inclined surface 28a of the reinforcing rib 28 matches the locking claw 31 provided on the lower surface of the reinforcing rib 27. Further, in each support plate portion 33, a hole portion 35 penetrating from the front to the back is formed in an end portion on which the locking claw 31 is provided.

As shown in FIG. 4A and FIG. 4B, lock claws 32 are formed on the lower surface of the reinforcing rib 27 and the upper surface of the reinforcing rib 28, respectively. The lock claw 32 provided on the reinforcing rib 27 is formed at a formation position of one locking claw 31 located at a position farthest from the arm portion 23 among the locking claws 31, and the lock claw 32 provided on the reinforcing rib 28 is formed on one support plate portion 33 located at a position farthest from the arm portion 23 among the support plate portions 33.

As shown in FIG. 4A, the body portion 22 has a plurality of reinforcing ribs 29 at a coupling portion with the arm portion 23. The reinforcing ribs 29 are provided at intervals in an upper-lower direction of the vehicle, and each of the reinforcing ribs 29 is formed along the horizontal direction. This enhances the strength of the lid 20 against a force applied to the coupling portion during opening and closing.

A back plate portion 30 that is recessed toward a back surface side is provided at the coupling portion of the body portion 22 with the arm portion 23. The upper and lower reinforcing ribs 29 of the three reinforcing ribs 29 provided at the coupling portion at an interval in the upper-lower direction have a gap with the back plate portion 30, and the intermediate reinforcing rib 29 is formed integrally with the back plate portion 30. In the intermediate reinforcing rib 29, a hole portion 29a penetrating from the front to the back is formed at a position in the vicinity of the back plate portion 30.

The body portion 22 has a drain port 34 formed in a bottom portion of the peripheral wall portion 25. Further, in the peripheral wall portion 25 of the body portion 22, an engagement recessed portion 36 is formed on an arm portion 23 side. Further, in the body portion 22, a vertical rib 38 is formed on the arm portion 23 side of the flat plate portion 26. A left end portion of the reinforcing rib 29 in FIG. 4A is connected to a right side surface of the vertical rib 38, and a right end portion of the reinforcing rib 29 is connected to the peripheral wall portion 25.

Figure 5:
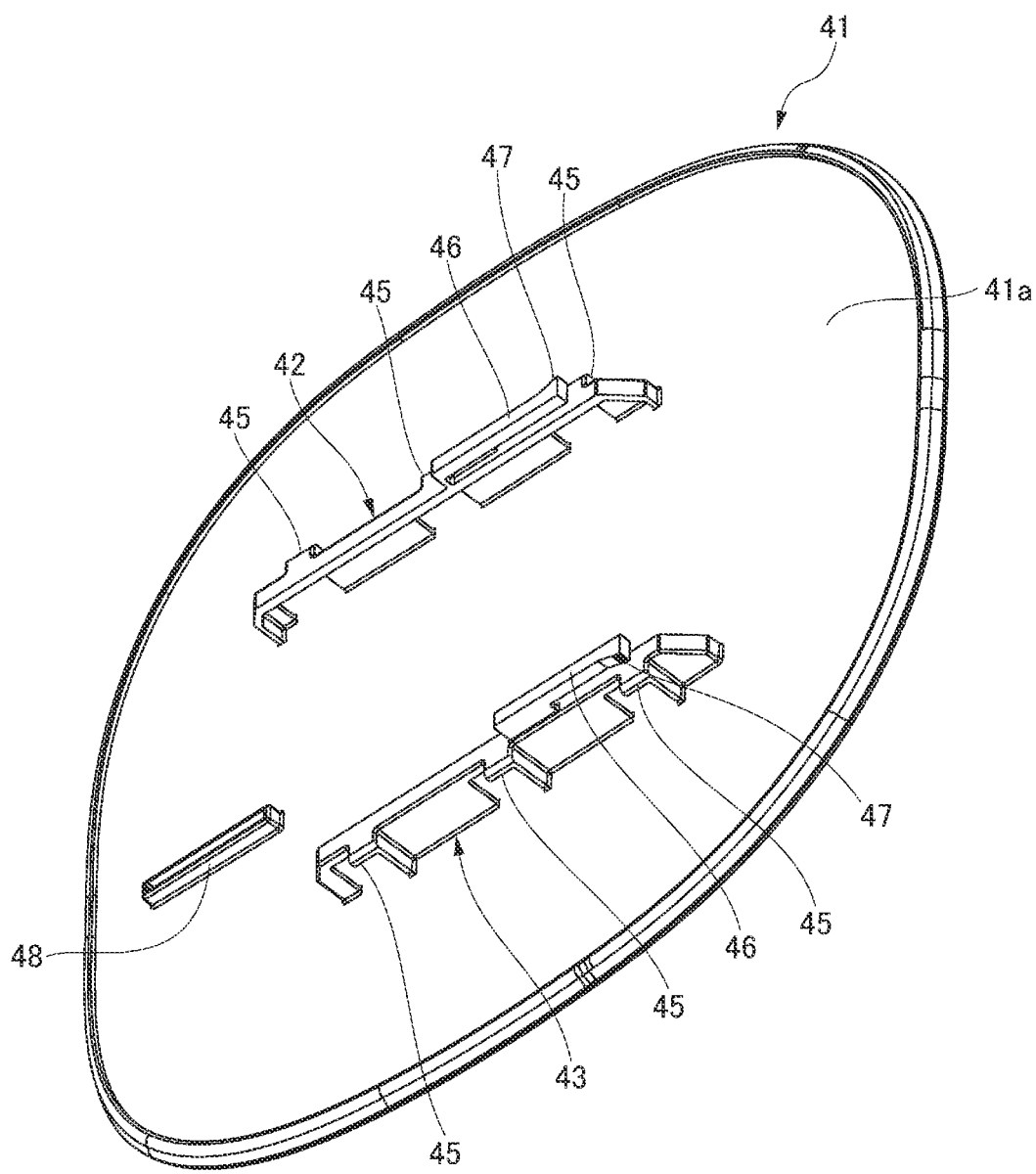
FIG. 5 is a perspective view of the lid body constituting a lid as viewed from below.

FIG. 5 is a perspective view of the lid body constituting a lid as viewed from below. As shown in FIG. 5, the lid body 41 constituting the lid 20 is formed in a flat plate shape, and is attached to the body portion 22 of the support body 21. The lid body 41 has a larger outer shape than the body portion 22 of the support body 21. Accordingly, the lid body 41 is attached to the body portion 22 in a state in which a peripheral edge portion thereof protrudes from an outer periphery of the body portion 22 over an entire periphery.

The lid body 41 has two locking portions 42, 43 provided on an attachment surface 41a attached to the body portion 22 at an interval in the upper-lower direction. The locking portions 42, 43 are formed along the horizontal direction. The locking portions 42, 43 are provided at positions corresponding to the reinforcing ribs 27, 28 of the body portion 22. Each of the locking portions 42, 43 includes three L-shaped locking claws 45 and a lock portion 46, the locking claws 45 of the locking portion 42 and the locking claws 45 of the locking portion 43 protruding to opposite sides. The locking claws 45 are formed at intervals in the horizontal direction. A lock claw 47 is formed on the lock portion 46, and the lock claw 47 is disposed in the vicinity of one locking claw 45 on one side portion side of the lid body 41. Further, an engagement protrusion 48 extending in the horizontal direction is formed on the attachment surface 41a of the lid body 41 near one side portion.

Figure 6A:
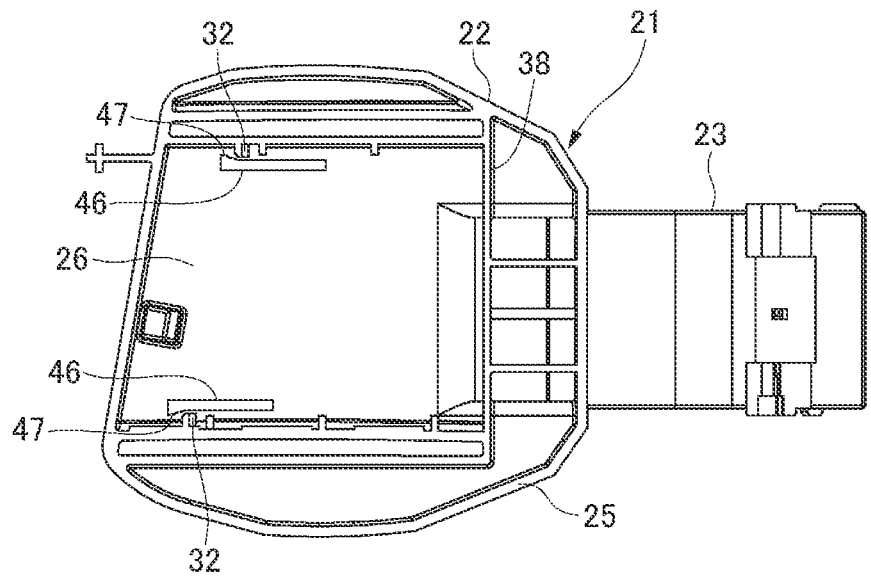
FIG. 6A shows view of a state before the lid body is attached to a body portion and is a schematic cross-sectional view in a plane direction showing a positional relationship between lock claws on an inner side of an attachment surface of the lid body.
Figure 6B:
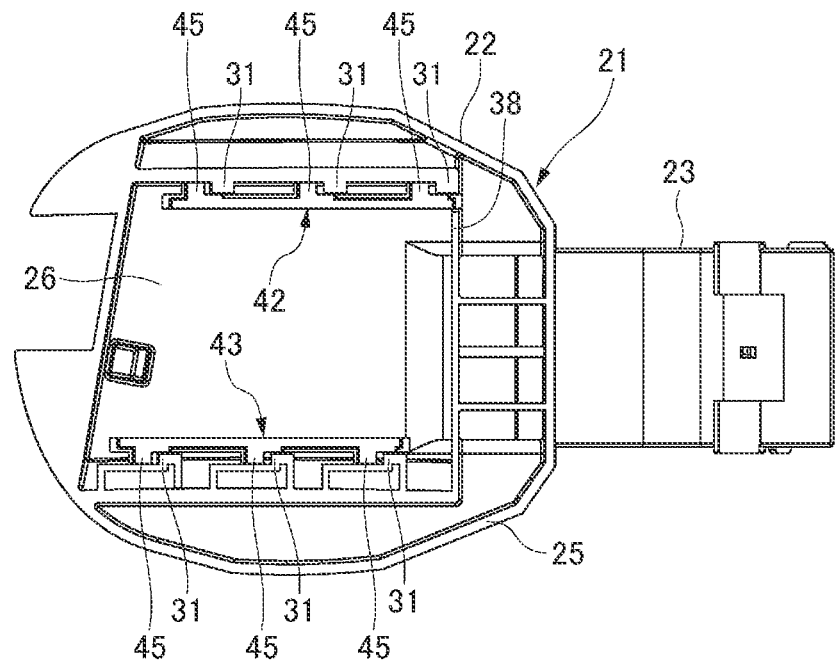
FIG. 6B shows view of the state before the lid body is attached to the body portion and is a schematic cross-sectional view in the plane direction showing a positional relationship between locking claws on the inner side of the attachment surface of the lid body.
Figure 6C:
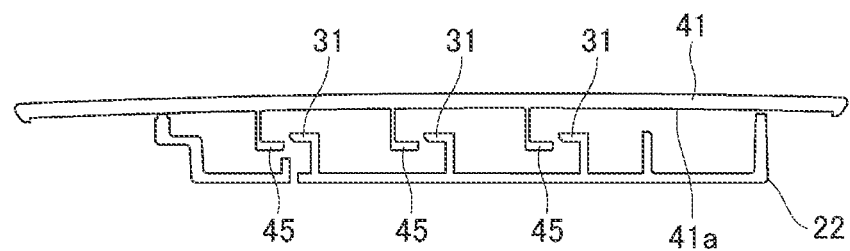
FIG. 6C shows view of the state before the lid body is attached to the body portion and is a schematic cross-sectional view in the horizontal direction showing the positional relationship between the locking claws.
Figure 7A:
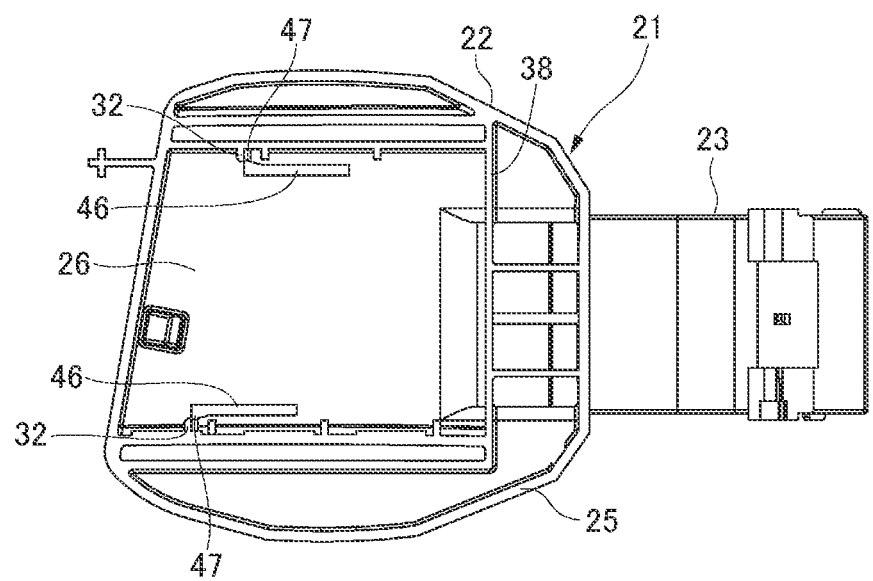
FIG. 7A shows view of a state in which the lid body is attached to the body portion and is a schematic cross-sectional view in the plane direction showing a locking state of the lock claws on the inner side of the attachment surface of the lid body.
Figure 7B:
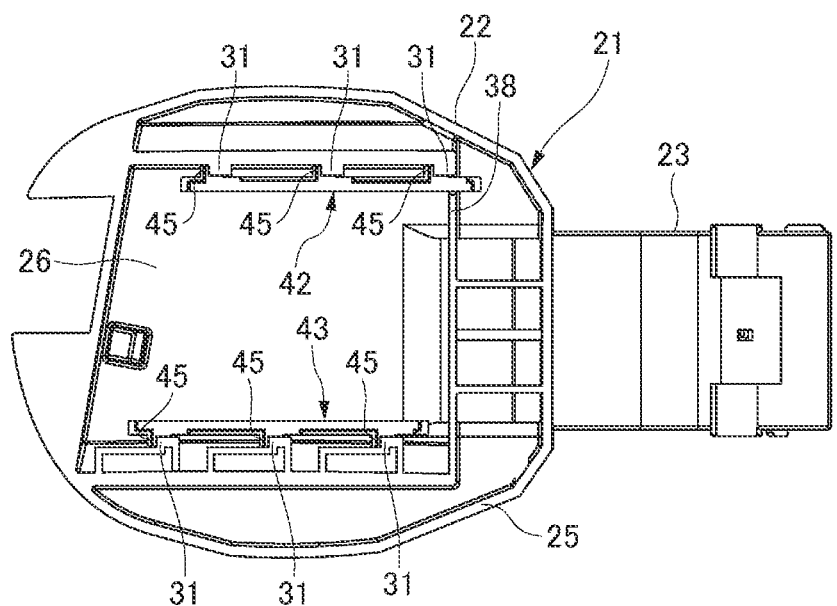
FIG. 7B shows view of the state in which the lid body is attached to the body portion and is a schematic cross-sectional view in the plane direction showing a locking state of the locking claws on the inner side of the attachment surface of the lid body.
Figure 7C:
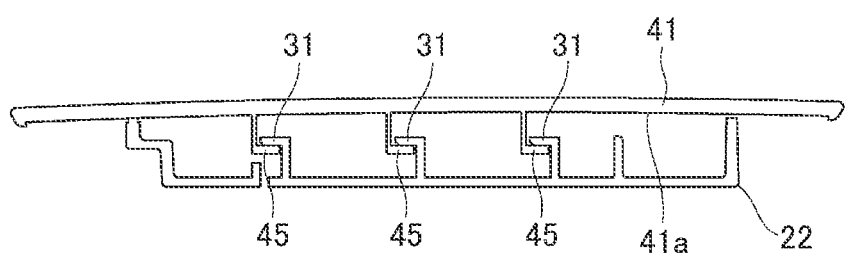
FIG. 7C shows view of the state in which the lid body is attached to the body portion and is a schematic cross-sectional view in the horizontal direction showing the locking state of the locking claws.

Next, a case where the lid body 41 is attached to the support body 21 will be described. FIGS. 6A to 6C and FIGS. 7A to 7C are views illustrating a method for attaching the lid body to the body portion, in which FIGS. 6A to 6C show views of a state before the lid body is attached to the body portion, and FIGS. 7A to 7C show views of a state in which the lid body is attached to the body portion.

First, the lid body 41 is placed on the body portion 22 of the support body 21 so as to be shifted to the opposite side of the arm portion 23, and the attachment surface 41a of the lid body 41 to the body portion 22 abuts on a peripheral edge of the peripheral wall portion 25 of the body portion 22. In this way, as shown in FIG. 6A, the lock claws 47 of the lid body 41 are disposed in the vicinity of the lock claws 32 of the body portion 22. As shown in FIG. 6B and FIG. 6C, the locking claws 45 of the lid body 41 are disposed in the vicinity of the locking claws 31 of the body portion 22. Further, the engagement protrusion 48 of the lid body 41 is engaged with the engagement recessed portion 36 of the body portion 22.

Next, the lid body 41 is slid toward the arm portion 23 side with respect to the body portion 22. At this time, since the engagement protrusion 48 of the lid body 41 is engaged with the engagement recessed portion 36 of the body portion 22, the lid body 41 is guided and smoothly slid with respect to the body portion 22. When the lid body 41 is slid toward the arm portion 23 side with respect to the body portion 22, as shown in FIG. 7A, the lock claws 47 of the lid body 41 are locked to the lock claws 32 of the body portion 22. As shown in FIG. 7B and FIG. 7C, the locking claws 45 of the lid body 41 are locked to the locking claws 31 of the body portion 22. Accordingly, the lid body 41 is attached to the body portion 22 of the support body 21.

Figure 8A:
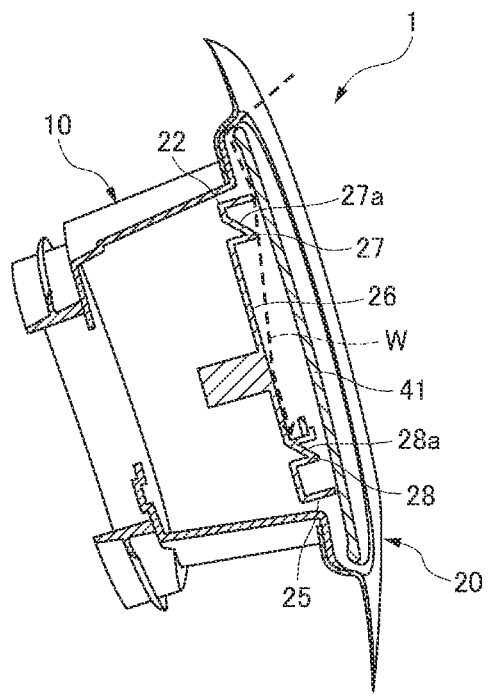
FIG. 8A shows view of a flow of water in the lid and is a cross-sectional view taken along a line A-A in FIG. 4A.
Figure 8B:
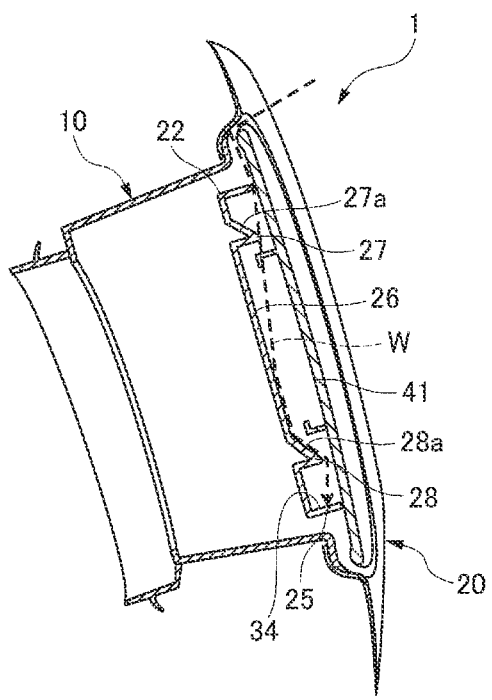
FIG. 8B shows view of the flow of water in the lid and is a cross-sectional view taken along a line B-B in FIG. 4A.

FIG. 8A and FIG. 8B show views of a flow of water in the lid, in which FIG. 8A is a cross-sectional view taken along a line A-A in FIG. 4A, and FIG. 8B is a cross-sectional view taken along a line B-B in FIG. 4A.

As shown in FIG. 8A and FIG. 8B, in the state in which the lid device 1 is mounted on the oil filler port 3 of the vehicle, the lid device 1 is disposed to be inclined such that the lid 20 side faces obliquely upward in a side view. In the state in which the lid device 1 is mounted on the oil filler port 3 in this way, the inclined surfaces 27a, 28a of the reinforcing ribs 27, 28 formed on the body portion 22 of the support body 21 are inclined such that the free end sides face downward.

Here, since the lid 20 is configured by assembling the lid body 41 to the support body 21, water may enter through a gap between the body portion 22 of the support body 21 and the lid body 41 during vehicle washing or the like.

As shown in FIG. 4A, FIG. 8A, and FIG. 8B, in the lid device 1 according to the present embodiment, water W that has entered from the gap between the body portion 22 of the support body 21 and the lid body 41 flows downward along the body portion 22 between the body portion 22 and the lid body 41. At this time, in the reinforcing ribs 27, 28 along the horizontal direction, the water W flows along the inclined surfaces 27a, 28a inclined such that free ends face downward, and is guided downward from the free ends of the reinforcing ribs 27, 28. Then, the water W guided downward along the body portion 22 between the body portion 22 and the lid body 41 is drained to the outside from the drain port 34 provided in a bottom portion of the body portion 22 of the support body 21 (see FIG. 3B and FIG. 4A).

Further, a part of the water W that has entered the gap between the body portion 22 of the support body 21 and the lid body 41 flows into the upper surface of the support plate portion 33 provided on the inclined surface 28a of the reinforcing rib 28. The water W that has flowed into the upper surface of the support plate portion 33 is not accumulated on the upper surface of the support plate portion 33, but is guided downward from the hole portion 35 on a locking claw 31 side and from an end portion on an opposite side of the locking claw 31, flows downward along the inclined surface 28a, and is drained to the outside from the drain port 34 (see FIG. 4A).

Figure 9:
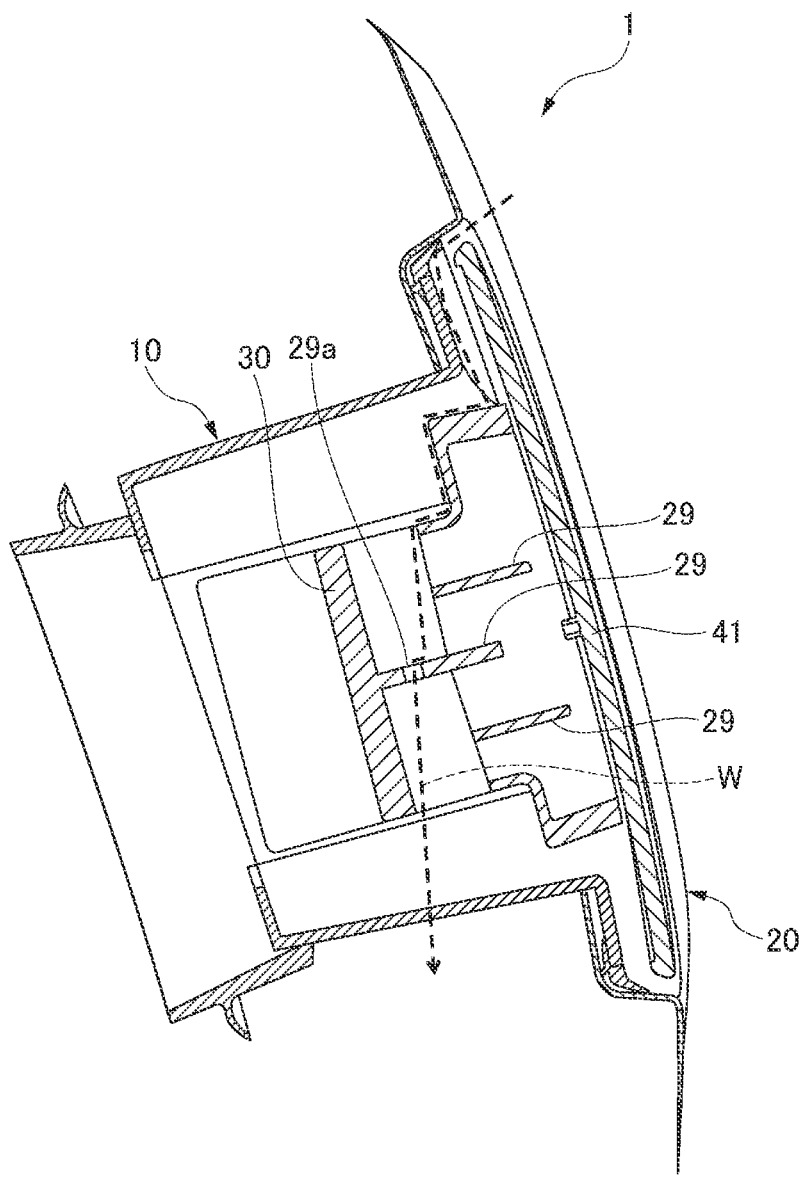
FIG. 9 is a cross-sectional view taken along a line C-C in FIG. 4A.

As shown in FIG. 4A and FIG. 9, the water W that has entered from the gap between the body portion 22 of the support body 21 and the lid body 41 also flows into the coupling portion of the body portion 22 with the arm portion 23. The water W passes through a gap between the upper reinforcing rib 29 and the back plate portion 30, and a gap between the back plate portion 30 and the hole portion 29a of the intermediate reinforcing rib 29 and between the back plate portion 30 and the lower reinforcing rib 29, flows downward as it is, and is drained downward from an edge portion of the design panel portion 11.

As described above, according to the lid device 1 of the present embodiment, the lid 20 can have sufficient strength by providing the reinforcing ribs 27, 28. Further, in the state in which the lid device 1 is mounted on the oil filler port 3, portions of the reinforcing ribs 27, 28 along the horizontal direction are the inclined surfaces 27a, 28a inclined such that the free end sides face downward. Accordingly, the water W that has entered between the body portion 22 of the support body 21 and the lid body 41 and dripped onto upper portions of the reinforcing ribs 27, 28 can be guided downward from the free ends of the reinforcing ribs 27, 28, and accumulation of the water W in the reinforcing ribs 27, 28 can be suppressed. Accordingly, when the lid 20 is opened, it is possible to suppress scattering of the water W from the lid 20 and splashing on the user.

Moreover, the water W that has entered between the body portion 22 of the support body 21 and the lid body 41 can be drained downward from the drain port 34 formed in the bottom portion of the body portion 22 of the support body 21. Accordingly, it is possible to more favorably suppress the scattering of water when the lid 20 is opened.

Further, the hole portion 35 penetrating from the front to the back is formed in the support plate portion 33 having the locking claw 31 that locks the lid body 41. Accordingly, the water W that has entered between the support body 21 and the lid body 41 and dripped onto an upper portion of the support plate portion 33 provided on the reinforcing rib 28 can be guided downward from the hole portion 35 of the support plate portion 33. Accordingly, it is possible to avoid accumulation of water in the support plate portion 33, and it is possible to further favorably suppress scattering of the water W when the lid 20 is opened.

The present disclosure is not limited to the above-described embodiment, and modifications, improvements, and the like can be made as appropriate. In addition, materials, shapes, dimensions, numbers, arrangement positions, and the like of the respective constituent elements in the above-described embodiment are optional and are not limited as long as the present disclosure can be achieved.

For example, the number of reinforcing ribs formed in the body portion 22 is not limited to two, and a horizontal length of the reinforcing ribs may be different from a horizontal length of the flat plate portion 26. Further, the reinforcing rib may have a portion along a direction different from the horizontal direction. The number of the locking claws 31 formed on the reinforcing rib is not limited to three.

The lid device 1 may be mounted on a power supply port of a hybrid vehicle, an electric automobile, or the like instead of the oil filler port 3.

Here, features of the lid device according to the embodiment of the present disclosure described above will be briefly summarized and listed in the following [1] to [3], respectively.

[1] A lid device (1) is mounted on an oil filler port (3) or an power supply port of a vehicle and is configured to open and close the oil filler port (3) or the power supply port. The lid device (1) includes a housing (10) configured to be assembled to the oil filler port (3) or the power supply port, a support body (21) provided to be rotatable with respect to the housing (10), and a lid body (41) attached to the support body (21). A reinforcing rib (27, 28) protruding toward a lid body (41) side is formed on the support body (21). A portion of the reinforcing rib (27, 28) along a horizontal direction is inclined such that a free end side faces downward when the lid device (1) is mounted on the oil filler port (3) or the power supply port.

According to the lid device having the configuration of the above [1], a lid can have sufficient strength by providing the reinforcing rib on the support body. Further, in the state in which the lid device is mounted on the oil filler port or the power supply port, the portion of the reinforcing rib along the horizontal direction is inclined such that the free end side faces downward. Accordingly, water that has entered between the support body and the lid body and dripped onto an upper portion of the reinforcing rib can be guided downward from a free end of the reinforcing rib, and accumulation of the water in the reinforcing rib can be suppressed. Accordingly, when the lid is opened, it is possible to suppress scattering of water from the lid and splashing on the user.

[2] The lid device according to the above [1], in which a drain port (34) draining water (W) that has entered between the support body (21) and the lid body (41) downward is formed in a bottom portion of the support body (21).

According to the lid device having the configuration of the above [2], the water that has entered between the support body and the lid body can be drained downward from the drain port formed in the bottom portion of the support body. Accordingly, it is possible to more favorably suppress the scattering of water when the lid is opened.

[3] The lid device according to the above [1] or [2], in which a support plate portion (33) having a locking claw (31) configured to lock the lid body (41) is provided on an inclined surface (28a) inclined such that the free end side of the reinforcing rib (28) faces downward. A hole portion (35) penetrating from a front to a back is formed in the support plate portion (33).

According to the lid device having the configuration of the above [3], the hole portion penetrating from the front to the back is formed in the support plate portion having the locking claw that locks the lid body. Accordingly, the water that has entered between the support body and the lid body and dripped onto an upper portion of the support plate portion provided on the reinforcing rib can be guided downward from the hole portion of the support plate portion. Accordingly, it is possible to avoid accumulation of water in the support plate portion, and it is possible to further favorably suppress scattering of water when the lid is opened.

The invention claimed is:

1. A lid device to be mounted on an oil filler port or a power supply port of a vehicle and that is configured to open and close the oil filler port or the power supply port, the lid device comprising:
   a housing configured to be assembled to the oil filler port or the power supply port;
   a support body provided to be rotatable with respect to the housing; and
   a lid body attached to the support body,
   wherein a reinforcing rib protruding toward the lid body is formed on the support body, the reinforcing rib being disposed between the lid body and the support body, and
   wherein a portion of the reinforcing rib along a horizontal direction is inclined such that a free end side of the inclined portion of the reinforcing rib faces downward when the lid device is mounted on the oil filler port or the power supply port.

2. The lid device according to claim 1,
   wherein a drain port draining water that has entered between the support body and the lid body downward is formed in a bottom portion of the support body, and
   wherein the inclined portion of the reinforcing rib and the drain port are disposed such that the water that has entered between the support body and the lid body flows downward along the inclined portion of the reinforcing rib and then to the drain port.

3. The lid device according to the claim 1,
   wherein a support plate portion having a locking claw configured to lock the lid body to the support body is provided on an inclined surface inclined such that the free end side of the reinforcing rib faces downward, and
   wherein a hole portion penetrating from a front to a back is formed in the support plate portion.

4. The lid device according to the claim 2,
   wherein a support plate portion having a locking claw configured to lock the lid body is provided on an inclined surface inclined such that the free end side of the reinforcing rib faces downward, and
   wherein a hole portion penetrating from a front to a back is formed in the support plate portion.

5. A lid device to be mounted on an oil filler port or a power supply port of a vehicle and that is configured to open and close the oil filler port or the power supply port, the lid device comprising:
   a housing configured to be assembled to the oil filler port or the power supply port;
   a support body provided to be rotatable with respect to the housing; and
   a lid body attached to the support body, wherein a pair of reinforcing ribs protruding toward the lid body are formed on the support body, the pair of reinforcing ribs comprising an upper reinforcing rib and a lower reinforcing rib, and being disposed between the lid body and the support body, wherein an upper surface of each of the pair of the reinforcing ribs is inclined such that a free end side of the inclined portion of the pair of the reinforcing ribs faces downward when the lid device is mounted on the oil filler port or the power supply port, wherein a support plate portion protruding from the inclined surface is provided on the lower reinforcing rib, wherein a locking claw for locking the lid body to the support body is provided on each of a lower surface of the upper reinforcing rib and the support plate portion of the lower reinforcing rib, wherein an upper surface of the support plate portion is parallel to the lower surface of the upper reinforcing rib, and wherein a posture of the locking claw provided on the support plate portion of the lower reinforcing rib is matched with a posture of the locking claw provided on the lower surface of the upper reinforcing rib.

\* \* \* \* \*